(12) United States Patent
Shimazu et al.

(10) Patent No.: US 7,786,717 B2
(45) Date of Patent: Aug. 31, 2010

(54) TRANSFORMING APPARATUS FOR AUTOMATICALLY ADJUSTING THREE-PHASE POWER SUPPLY VOLTAGE

(75) Inventors: Chiyuki Shimazu, Saitama (JP); Seiji Tsunemi, Saitama (JP)

(73) Assignee: E-Four Corporation, Saitama-Shi (JP)

( * ) Notice: Subject to any disclaimer, the term of this patent is extended or adjusted under 35 U.S.C. 154(b) by 18 days.

(21) Appl. No.: 12/377,920

(22) PCT Filed: Jul. 24, 2008

(86) PCT No.: PCT/JP2008/063267
§ 371 (c)(1),
(2), (4) Date: Feb. 18, 2009

(87) PCT Pub. No.: WO2009/136451
PCT Pub. Date: Nov. 12, 2009

(65) Prior Publication Data
US 2010/0164444 A1    Jul. 1, 2010

(51) Int. Cl.
*H01F 33/00* (2006.01)
(52) U.S. Cl. .................... 323/361
(58) Field of Classification Search ............ 323/258, 323/263, 331, 343, 349, 361
See application file for complete search history.

(56) References Cited
U.S. PATENT DOCUMENTS
5,654,627 A * 8/1997 Shimazu et al. ............ 323/258

(Continued)

FOREIGN PATENT DOCUMENTS
EP        0 637 122 A1    2/1995

(Continued)

OTHER PUBLICATIONS

Notification of Reasons for Rejection mailed Feb. 3, 2009 (with English translation).

(Continued)

*Primary Examiner*—Adolf Berhane
(74) *Attorney, Agent, or Firm*—Rothwell, Figg, Ernst & Manbeck, P.C.

(57) ABSTRACT

A transforming apparatus automatically adjusting the voltage of three-phase power supply comprising three input terminals, three output terminals, a Y-connection three-phase transformer, a switch group, and a switch switching circuit. The three input terminals are respectively connected to three main lines of the three-phase power supply, and the three output terminals are connected to a load installation. The Y-connection three-phase transformer comprises a core, an R-phase winding circuit, an S-phase winding circuit, and a T-phase winding circuit. In the R-phase winding circuit, an R-phase main winding, an R-phase first auxiliary winding, an R-phase first switch, an R-phase second auxiliary winding, and an R-phase third auxiliary winding are serially connected in that order between the input terminal Rin and a neutral point O, the output terminal Rout being connected to the other end of the R-phase main winding. An R-phase second switch is connected in parallel with a series circuit of the R-phase first auxiliary winding and the R-phase first switch. An R-phase third switch is connected in parallel with a series circuit of the R-phase first auxiliary winding, the R-phase first switch, and the R-phase second auxiliary winding. An R-phase fourth switch is connected in parallel with a series circuit of the R-phase second auxiliary winding and the R-phase third auxiliary winding. The switch switching circuit controls the switches based on the voltage levels of the output terminals to switch between first to fourth modes in an alternative manner.

2 Claims, 5 Drawing Sheets

U.S. PATENT DOCUMENTS 6,066,945 A * 5/2000 Shimazu et al. ............. 323/361

FOREIGN PATENT DOCUMENTS

| JP | 06-45320 U | 6/1994 |
| JP | 9-247857 | 9/1997 |
| JP | 09-247857 A | 9/1997 |
| JP | 2000-125473 A | 4/2000 |
| JP | 3372178 B2 | 1/2003 |
| JP | 6-45320 | 6/2007 |
| WO | 97/02518 | 1/1997 |

OTHER PUBLICATIONS

Notice of Decision for Final Rejection issued Mar. 18, 2010 in Korean counterpart application, 5 pages.

Korean Office Action Application No. 10-2008-7030642, dated Nov. 16, 2009 (with English translation).

European Search Report mailed May 20, 2010.

* cited by examiner

TRANSFORMING APPARATUS FOR AUTOMATICALLY ADJUSTING THREE-PHASE POWER SUPPLY VOLTAGE

CROSS-REFERENCE TO RELATED APPLICATION(S)

This application is a 35 U.S.C. §371 National Phase Entry Application from PCT/JP2008/063267, filed Jul. 24, 2008, and designating the United States.

TECHNICAL FIELD

The present invention relates to a transforming apparatus which automatically adjusts the voltage of three-phase power supply led into a power consumer site to within a target voltage range lower than its rated voltage and supplies to load equipment, and particularly to such a transforming apparatus which has a Y-connect ion three-phase transformer as its basic configuration.

BACKGROUND ART

In, for example, hotels, supermarkets, factories, etc., lighting equipment, air conditioning equipment, power equipment, or the like consumes a large amount of electric power. Recently, such general power consumers have strongly recognized the necessity for energy saving measures, and various measures have been come up with and are being carried out.

One of energy saving measures adoptable by general power consumers is a known scheme where the electricity receiving system leading commercial power supply into indoor equipment is provided with the transforming apparatus disclosed in Japanese Patent No. 2750275 or No. 3372178, which automatically adjusts the voltage of commercial power supply to a voltage several percent lower than its rated voltage and supplies to load equipment.

In areas which are inferior in the stability of power generating facilities and power distribution facilities, power supply voltage at receiving points of power consumers is not stable and often fluctuates over a voltage range slightly higher than the rated voltage. In such a situation, by supplying power supply whose voltage is automatically adjusted by a transforming apparatus to a voltage several percent lower than the rated voltage to load equipment, power consumption by the load equipment is greatly reduced, thus producing an especially large energy saving effect.

DISCLOSURE OF THE INVENTION

Problems to be Solved by the Invention

The transforming apparatus disclosed in above-cited Japanese Patent No. 3372178 automatically adjusts the voltage of three-phase power supply to within a target voltage range lower than the rated voltage and supplies to load equipment. However, the winding configuration of the transformer used in this transforming apparatus is not in the Y-connection but a special configuration where the current and magnetic flux of each phase are combined with those of the other phases, and hence it is extremely difficult to design its winding circuit and magnetic circuit so as to achieve desired characteristics.

The above conventional transforming apparatus is configured to change its transformation characteristic by switching on/off a plurality of switches connecting the different phases in combination, and thus the switch needs to be switched on/off at a timing that the voltage between opposite ends of the switch (voltage between different phases) becomes zero. Hence, a switch control circuit thereof is complicated, and thus it is difficult to secure the stability and reliability of switching operation timings.

An object of the present invention is to provide a transforming apparatus with a Y-connection three-phase transformer as its basic configuration which automatically adjusts the voltage of three-phase power supply to within a target voltage range lower than the rated voltage and supplies to load equipment.

Means for Solving the Problems

A transforming apparatus according to the present invention is characterized by the following items (1) to (22):

(1) being a transforming apparatus automatically adjusting the voltage of three-phase power supply comprising three input terminals (Rin, Sin, Tin), three output terminals (Rout, Sout, Tout), a Y-connection three-phase transformer, a switch group, and a switch switching circuit;

(2) the three input terminals (Rin, Sin, Tin) being respectively connected to three main lines of the three-phase power supply;

(3) the three output terminals (Rout, Sout, Tout) being connected to a load installation;

(4) the Y-connection three-phase transformer comprising a core, an R-phase winding circuit, an S-phase winding circuit, and a T-phase winding circuit;

(5) in the R-phase winding circuit, an R-phase main winding, an R-phase first auxiliary winding, an R-phase first switch, an R-phase second auxiliary winding, and an R-phase third auxiliary winding being serially connected in that order between the input terminal Rin and a neutral point O, the output terminal Rout being connected to the other end of the R-phase main winding;

(6) an R-phase second switch of the switch group being connected in parallel with a series circuit of the R-phase first auxiliary winding and the R-phase first switch;

(7) an R-phase third switch of the switch group being connected in parallel with a series circuit of the R-phase first auxiliary winding, the R-phase first switch, and the R-phase second auxiliary winding;

(8) an R-phase fourth switch of the switch group being connected in parallel with a series circuit of the R-phase second auxiliary winding and the R-phase third auxiliary winding;

(9) in the S-phase winding circuit, an S-phase main winding, an S-phase first auxiliary winding, an S-phase first switch, an S-phase second auxiliary winding, and an S-phase third auxiliary winding being serially connected in that order between the input terminal Sin and the neutral point O, the output terminal Sout being connected to the other end of the S-phase main winding;

(10) an S-phase second switch of the switch group being connected in parallel with a series circuit of the S-phase first auxiliary winding and the S-phase first switch;

(11) an S-phase third switch of the switch group being connected in parallel with a series circuit of the S-phase first auxiliary winding, the S-phase first switch, and the S-phase second auxiliary winding;

(12) an S-phase fourth switch of the switch group being connected in parallel with a series circuit of the S-phase second auxiliary winding and the S-phase third auxiliary winding;

(13) in the T-phase winding circuit, a T-phase main winding, a T-phase first auxiliary winding, a T-phase first switch, a T-phase second auxiliary winding, and a T-phase third auxiliary winding being serially connected in that order between the input terminal Tin and the neutral point O, the output terminal Tout being connected to the other end of the T-phase main winding;

(14) a T-phase second switch of the switch group being connected in parallel with a series circuit of the T-phase first auxiliary winding and the T-phase first switch;

(15) a T-phase third switch of the switch group being connected in parallel with a series circuit of the T-phase first auxiliary winding, the T-phase first switch, and the T-phase second auxiliary winding;

(16) a T-phase fourth switch of the switch group being connected in parallel with a series circuit of the T-phase second auxiliary winding and the T-phase third auxiliary winding;

(17) the switch switching circuit controlling the switches based on the voltage levels of the output terminals (Rout, Sout, Tout) or the input terminals (Rin, Sin, Tin) to switch between first to fourth modes in an alternative manner;

(18) in the first mode, the first switch of each phase being ON, and the second, third, and fourth switches of each phase being OFF;

(19) in the second mode, the second switch of each phase being ON, and the first, third, and fourth switches of each phase being OFF;

(20) in the third mode, the third switch of each phase being ON, and the first, second, and fourth switches of each phase being OFF;

(21) in the fourth mode, the fourth switch of each phase being ON, and the first, second, and third switches of each phase being OFF; and

(22) the switch switching circuit switching on/off the switches of each phase at a timing that the voltage instantaneous value of the phase becomes zero to switch the modes.

EXPLANATION OF REFERENCE NUMERALS

Figure 1:
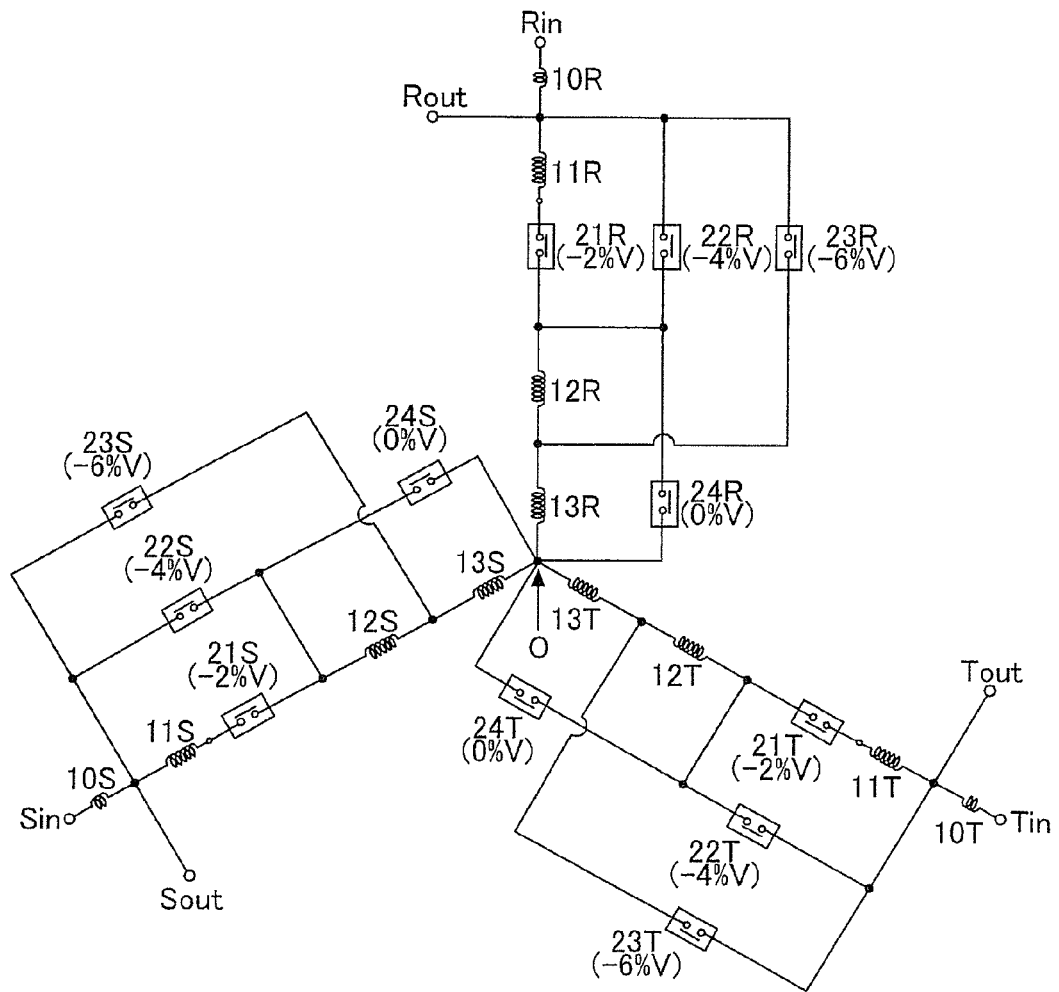
FIG. 1 is a winding configuration diagram of a transforming apparatus according to an embodiment of the present invention.

Rin, Sin, Tin Input terminal
Rout, Sout, Tout Output terminal
10R R-phase main winding
11R R-phase first auxiliary winding
12R R-phase second auxiliary winding
13R R-phase third auxiliary winding
21R R-phase first switch
22R R-phase second switch
23R R-phase third switch
24R R-phase fourth switch
10S S-phase main winding
11S S-phase first auxiliary winding
12S S-phase second auxiliary winding
13S S-phase third auxiliary winding
21S S-phase first switch
22S S-phase second switch
23S S-phase third switch
24S S-phase fourth switch
10T T-phase main winding
11T T-phase first auxiliary winding
12T T-phase second auxiliary winding
13T T-phase third auxiliary winding
21T T-phase first switch
22T T-phase second switch
23T T-phase third switch
24T T-phase fourth switch
5 Core
5R R-phase winding portion
5S S-phase winding portion
5T T-phase winding portion
8 Switch switching circuit
81 Voltage detecting circuit
82 Microcomputer
83 Drive circuit
51, 52 Thyristor
53 Gate signal generating circuit
54, 55 Voltage detecting circuit

BEST MODE FOR CARRYING OUT THE INVENTION

Outline of the Transforming Apparatus

Figure 3:
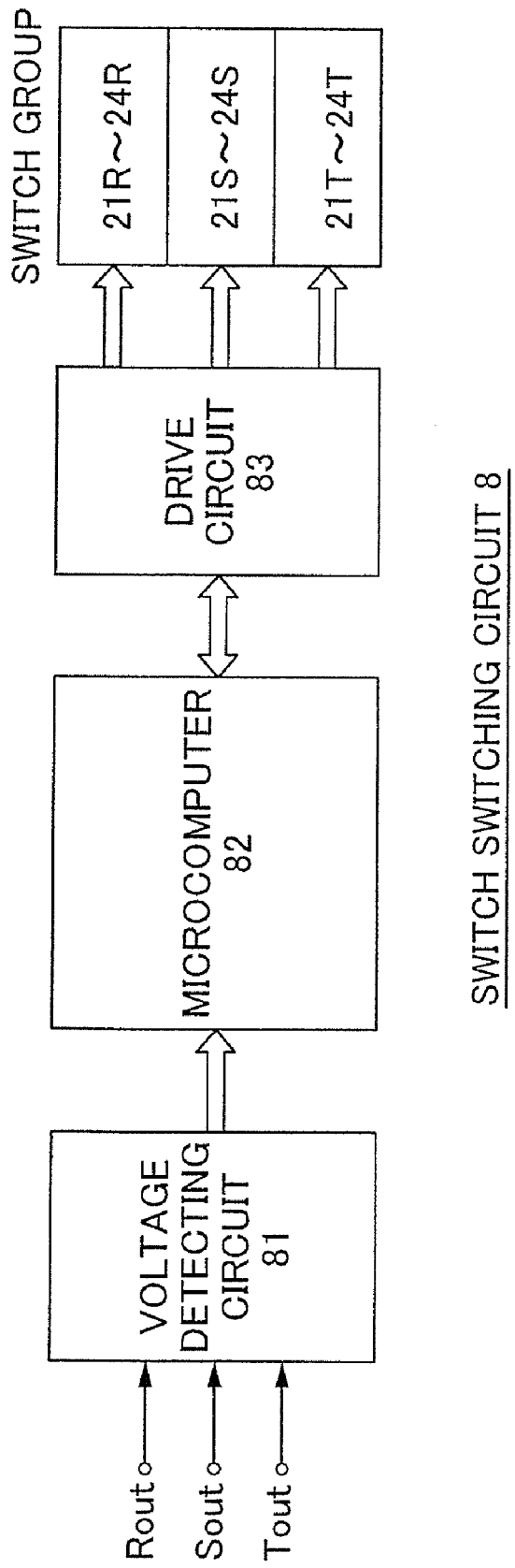
FIG. 3 shows the configuration of a switch switching circuit according to the embodiment of the present invention.

FIG. 1 shows the winding configuration of a transforming apparatus according to the present invention, and FIG. 3 shows the configuration of a switch switching circuit 8. First, the overall outline of this transforming apparatus will be described.

This transforming apparatus comprises three input terminals Rin, Sin, Tin connected respectively to the three main lines of three-phase power supply and three output terminals Rout, Sout, Tout connected to a load installation. The transforming apparatus switches between a first mode where the output voltage is made about 2% lower than the input voltage, a second mode where the output voltage is made about 4% lower than the input voltage, a third mode where the output voltage is made about 6% lower than the input voltage, and a fourth mode where the output voltage is substantially equal to the input voltage in an alternative manner.

The transforming apparatus comprises, as its basic configuration, a Y-connection three-phase transformer made up of an R-phase winding circuit, an S-phase winding circuit, and a T-phase winding circuit, which are the same in configuration, as shown in FIG. 1.

===R-Phase Winding Circuit===

In the R-phase winding circuit, an R-phase main winding 10R, an R-phase first auxiliary winding 11R, an R-phase first switch 21R, an R-phase second auxiliary winding 12R, and an R-phase third auxiliary winding 13R are serially connected in that order between the input terminal Rin and a neutral point O. The output terminal Rout is connected to the other end of the R-phase main winding 10R.

An R-phase second switch 22R is connected in parallel with a series circuit of the R-phase first auxiliary winding 11R and the R-phase first switch 21R.

An R-phase third switch 23R is connected in parallel with a series circuit of the R-phase first auxiliary winding 11R, the R-phase first switch 21R, and the R-phase second auxiliary winding 12R.

An R-phase fourth switch 24R is connected in parallel with a series circuit of the R-phase second auxiliary winding 12R and the R-phase third auxiliary winding 13R.

===S-Phase Winding Circuit===

In the S-phase winding circuit, an S-phase main winding 10S, an S-phase first auxiliary winding 11S, an S-phase first switch 21S, an S-phase second auxiliary winding 12S, and an S-phase third auxiliary winding 13S are serially connected in that order between the input terminal Sin and the neutral point O. The output terminal Sout is connected to the other end of the S-phase main winding 10S.

An S-phase second switch 22S is connected in parallel with a series circuit of the S-phase first auxiliary winding 11S and the S-phase first switch 21S.

An S-phase third switch 23S is connected in parallel with a series circuit of the S-phase first auxiliary winding 11S, the S-phase first switch 21S, and the S-phase second auxiliary winding 12S.

An S-phase fourth switch 24S is connected in parallel with a series circuit of the S-phase second auxiliary winding 12S and the S-phase third auxiliary winding 13S.

===T-Phase Winding Circuit===

In the T-phase winding circuit, a T-phase main winding 10T, a T-phase first auxiliary winding 11T, a T-phase first switch 21T, a T-phase second auxiliary winding 12T, and a T-phase third auxiliary winding 13T are serially connected in that order between the input terminal Tin and the neutral point O. The output terminal Tout is connected to the other end of the T-phase main winding 10T.

A T-phase second switch 22T is connected in parallel with a series circuit of the T-phase first auxiliary winding 11T and the T-phase first switch 21T.

A T-phase third switch 23T is connected in parallel with a series circuit of the T-phase first auxiliary winding 11T, the T-phase first switch 21T, and the T-phase second auxiliary winding 12T.

A T-phase fourth switch 24T is connected in parallel with a series circuit of the T-phase second auxiliary winding 12T and the T-phase third auxiliary winding 13T.

===Example of Core 5===

Figure 2:
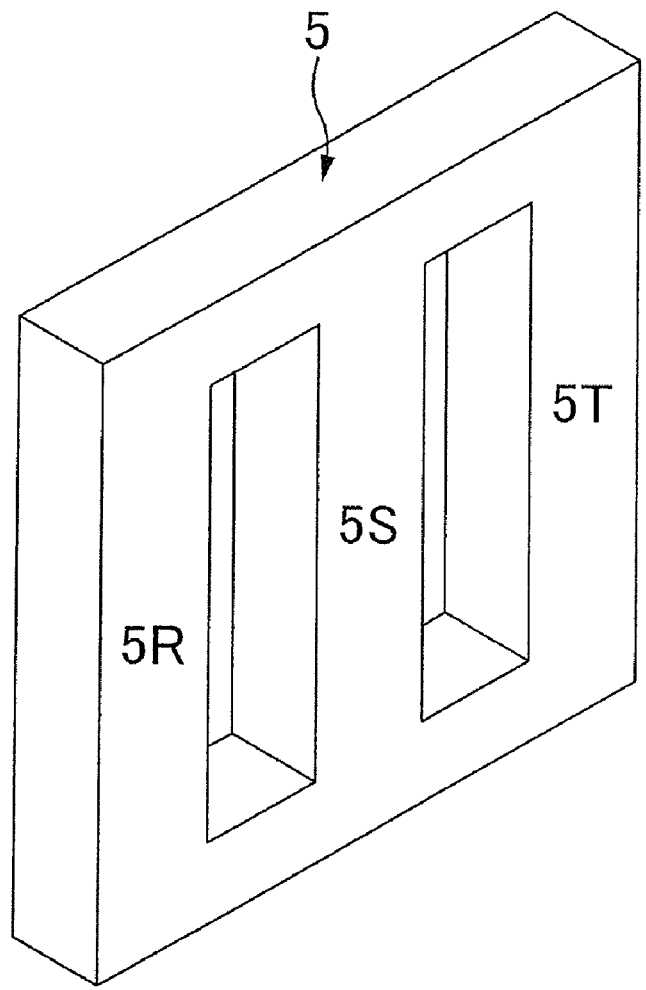
FIG. 2 is a configuration diagram of a core according to the embodiment of the present invention.

FIG. 2 shows an example of the form of a core 5 of the Y-connection three-phase transformer. The windings 10R, 11R, 12R, 13R of the R-phase winding circuit are wound around an R-phase winding portion 5R of the core 5. The windings 10S, 11S, 12S, 13S of the S-phase winding circuit are wound around an S-phase winding portion 5S of the core 5. The windings 10T, 11T, 12T, 13T of the T-phase winding circuit are wound around a T-phase winding portion 5T of the core 5.

===Outline of Switch Switching Circuit 8===

FIG. 3 shows an example of the configuration of the switch switching circuit 8. The switch switching circuit 8 is configured to monitor the voltage levels of the output terminals Rout, Sout, Tout and control a group of the switches of FIG. 1 to switch between the first to fourth modes in an alternative manner such that the output voltage is within a predetermined target voltage range.

In the first mode, the first switch 21R, 21S, 21T of each phase becomes ON, and all the other switches (the second, third, and fourth switches of each phase) become OFF. In the first mode, the output voltage is about 2% lower than the input voltage.

In the second mode, the second switch 22R, 22S, 22T of each phase becomes ON, and all the other switches (the first, third, and fourth switches of each phase) become OFF. In the second mode, the output voltage is about 4% lower than the input voltage.

In the third mode, the third switch 23R, 23S, 23T of each phase becomes ON, and all the other switches (the first, second, and fourth switches of each phase) become OFF. In the third mode, the output voltage is about 6% lower than the input voltage.

In the fourth mode, the fourth switch 24R, 24S, 24T of each phase becomes ON, and all the other switches (the first, second, and third switches of each phase) become OFF. In the fourth mode, the output voltage is substantially equal to the input voltage.

===Details of Switch Switching Circuit 8===

As shown in FIG. 3, the switch switching circuit 8 comprises a voltage detecting circuit 81, a microcomputer 82, and a drive circuit 83. The voltage detecting circuit 81 detects the voltage levels of the output terminals Rout, Sout, Tout and inputs a detection signal to the microcomputer 82. Performing a process shown in the flow chart of FIG. 4 based on the detection signal from the voltage detecting circuit 81, the microcomputer 82 inputs control signals to the drive circuit 83 to switch between the first to fourth modes in an alternative manner. According to the control signals from the microcomputer 82, the drive circuit 83 switches on/off the first to fourth switches 21R to 24R of the R-phase, the first to fourth switches 21S to 24S of the S-phase, and the first to fourth switches 21T to 24T of the T-phase as described above.

Figure 4:
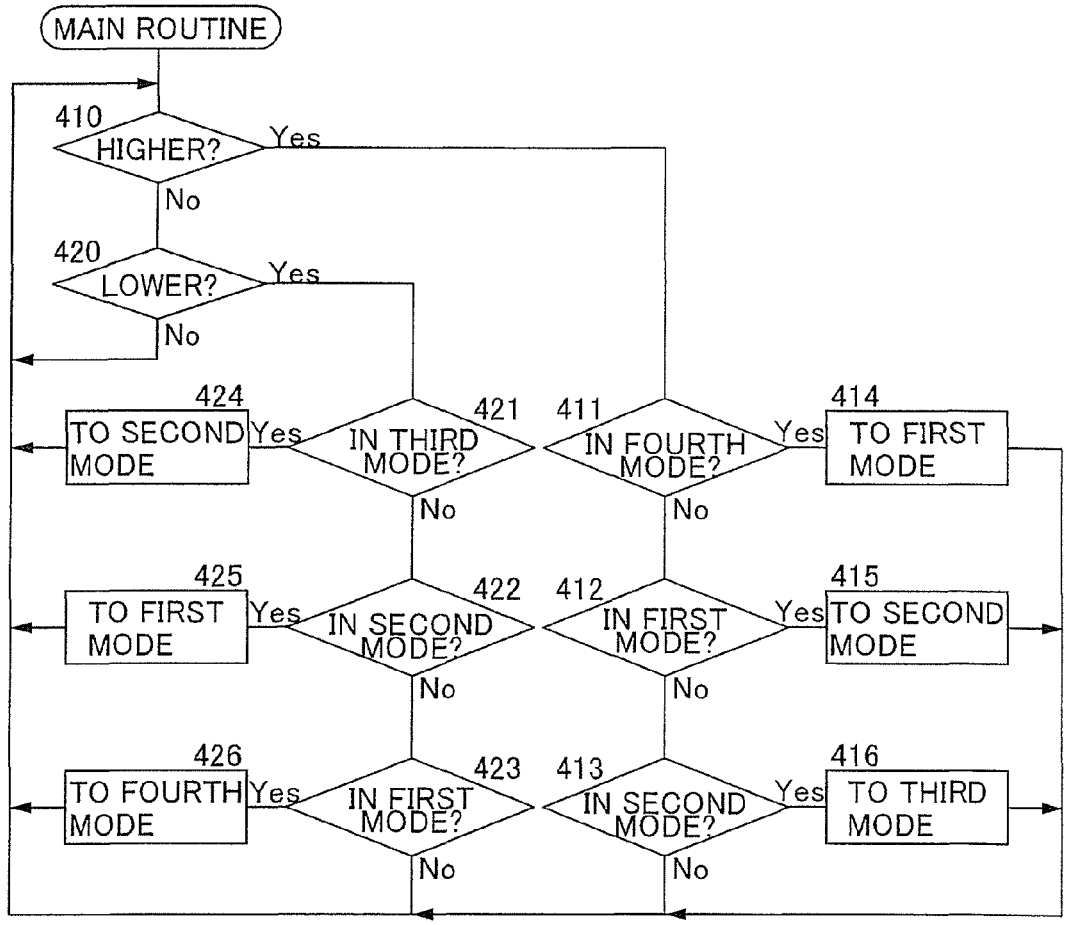
FIG. 4 is a flow chart of the process procedure by a microcomputer 82 in the embodiment.

An example of the process procedure of the microcomputer 82 will be described with reference to the flowchart of FIG. 4. The microcomputer 82 compares the programmed target voltage range and the detection signal from the voltage detecting circuit 81, thereby monitoring whether the output voltage is higher or lower than the target voltage range (steps 410 and 420).

If the output voltage is higher than the target voltage range, the process proceeds to a voltage lowering routine of step 411 and later. In the voltage lowering routine, when currently in the fourth mode (0% mode), the transformer is made to switch to the first mode (−2% mode); when currently in the first mode (−2% mode), to switch to the second mode (−4% mode); and when currently in the second mode (−4% mode), to switch to the third mode (−6% mode).

If the output voltage is lower than the target voltage range, the process proceeds to a voltage raising routine of step 421 and later. In the voltage raising routine, when currently in the third mode (−6% mode), the transformer is made to switch to the second mode (−4% mode); when currently in the second mode (−4% mode), to switch to the first mode (−2% mode); and when currently in the first mode (−2% mode), to switch to the fourth mode (0% mode).

===Specific Example of Switches and Drive Circuit 83===

As described above, the twelve switches are included in the circuit of the Y-connection three-phase transformer shown in FIG. 1, and these switches are individually switched on/off by the drive circuit 83 shown in FIG. 3. The twelve switches and their respective circuits in the drive circuit 83 are the same in configuration as one another.

Figure 5:
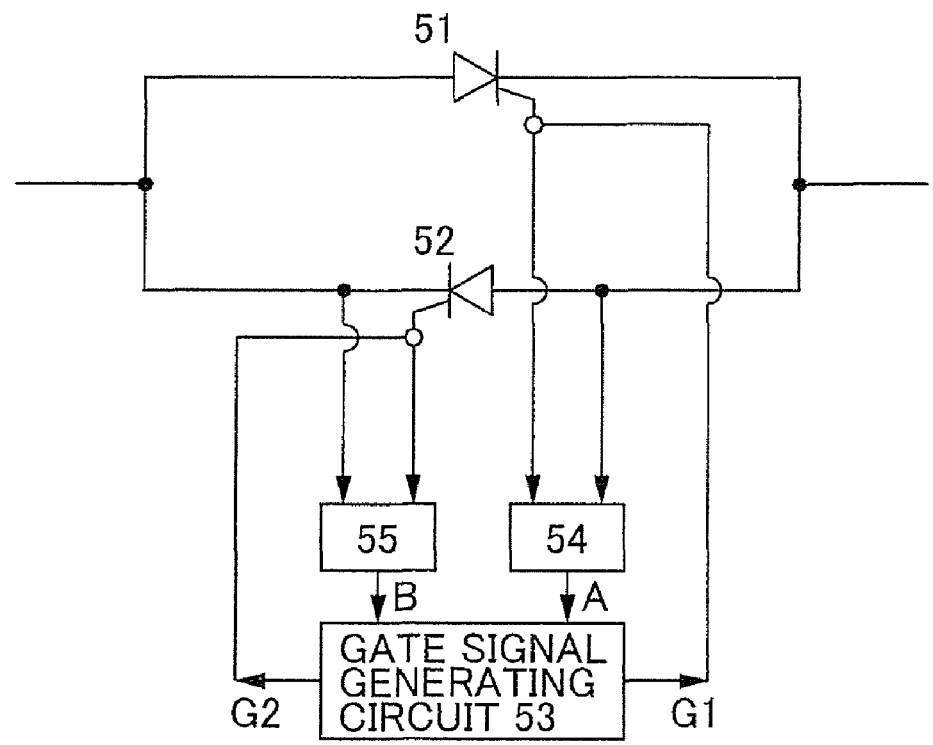
FIG. 5 shows an example configuration of one switch and its corresponding part in the switch switching circuit.

FIG. 5 shows an example configuration of one of the twelve switches and its one corresponding circuit in the drive circuit 83. The switch consists of two thyristors 51, 52 connected in parallel in an opposite direction to each other. The drive circuit 83 comprises a gate signal generating circuit 53 and two voltage detecting circuits 54, 55. The gate signal generating circuit 53 outputs a gate signal G1 to turn on the thyristor 51 and a gate signal G2 to turn on the thyristor 52.

The voltage detecting circuit 54 detects the gate-to-cathode voltage of the thyristor 51, and its output signal A becomes "1" when the gate-to-cathode voltage becomes zero (the current through the thyristor 51 becomes zero) and is at "0" when a current flows through the thyristor 51 with the gate-to-cathode voltage being not zero.

Likewise, the voltage detecting circuit 55 detects the gate-to-cathode voltage of the thyristor 52, and its output signal B becomes "1" when the gate-to-cathode voltage becomes zero (the current through the thyristor 52 becomes zero) and is at "0" when a current flows through the thyristor 5 with the gate-to-cathode voltage being not zero.

When the microcomputer 82 of FIG. 3 gives the drive circuit 83 of FIG. 3 (including the gate signal generating circuit 53) a control signal to instruct to turn off the thyristors 51, 52 (one switch), the gate signal generating circuit 53 turns off the thyristors 51, 52 through the gate signals thereof in response to the output signals A, B of the voltage detecting circuits 54, 55 changing to "1". Further, another switch (two thyristors connected in parallel in an opposite direction to each other) to be turned on instead of the thyristors 51, 52 (one switch) turned off is turned on.

As such, the switch switching circuit 8 of FIG. 3 is configured to switch on/off the switches of each phase at a timing that the voltage instantaneous value of the phase becomes zero to switch the modes. In the above embodiment, each switch consists of thyristors connected in parallel in an opposite direction to each other, and the switch switching circuit 8 comprises the voltage detector detecting the gate-to-cathode voltage of each thyristor and is configured to turn off a thyristor with turning on another thyristor in response to a timing that its gate-to-cathode voltage is detected to have just become zero via the voltage detector of the thyristor to be turned off.

What is claimed is:

1. A transforming apparatus automatically adjusting the voltage of a three-phase power supply comprising:
    three input terminals (Rin, Sin, Tin);
    three output terminals (Rout, Sout, Tout);
    a Y-connection three-phase transformer;
    a switch group; and
    a switch switching circuit, wherein:
    the three input terminals (Rin, Sin, Tin) are respectively connected to three main lines of the three-phase power supply;
    the three output terminals (Rout, Sout, Tout) are connected to a load installation;
    the Y-connection three-phase transformer comprises a core, an R-phase winding circuit, an S-phase winding circuit, and a T-phase winding circuit;
    in the R-phase winding circuit, an R-phase main winding, an R-phase first auxiliary winding, an R-phase first switch, an R-phase second auxiliary winding, and an R-phase third auxiliary winding are serially connected in that order between the input terminal Rin and a neutral point O, the output terminal Rout being connected to the other end of the R-phase main winding;
    an R-phase second switch of the switch group is connected in parallel with a series circuit of the R-phase first auxiliary winding and the R-phase first switch;
    an R-phase third switch of the switch group is connected in parallel with a series circuit of the R-phase first auxiliary winding, the R-phase first switch, and the R-phase second auxiliary winding;
    an R-phase fourth switch of the switch group is connected in parallel with a series circuit of the R-phase second auxiliary winding and the R-phase third auxiliary winding;
    in the S-phase winding circuit, an S-phase main winding, an S-phase first auxiliary winding, an S-phase first switch, an S-phase second auxiliary winding, and an S-phase third auxiliary winding are serially connected in that order between the input terminal Sin and the neutral point O, the output terminal Sout being connected to the other end of the S-phase main winding;
    an S-phase second switch of the switch group is connected in parallel with a series circuit of the S-phase first auxiliary winding and the S-phase first switch;
    an S-phase third switch of the switch group is connected in parallel with a series circuit of the S-phase first auxiliary winding, the S-phase first switch, and the S-phase second auxiliary winding;
    an S-phase fourth switch of the switch group is connected in parallel with a series circuit of the S-phase second auxiliary winding and the S-phase third auxiliary winding;
    in the T-phase winding circuit, a T-phase main winding, a T-phase first auxiliary winding, a T-phase first switch, a T-phase second auxiliary winding, and a T-phase third auxiliary winding are serially connected in that order between the input terminal Tin and the neutral point O, the output terminal Tout being connected to the other end of the T-phase main winding;
    a T-phase second switch of the switch group is connected in parallel with a series circuit of the T-phase first auxiliary winding and the T-phase first switch;
    a T-phase third switch of the switch group is connected in parallel with a series circuit of the T-phase first auxiliary winding, the T-phase first switch, and the T-phase second auxiliary winding;
    a T-phase fourth switch of the switch group is connected in parallel with a series circuit of the T-phase second auxiliary winding and the T-phase third auxiliary winding;
    the switch switching circuit controls the switches based on the voltage levels of the output terminals (Rout, Sout, Tout) or the input terminals (Rin, Sin, Tin) to switch between first to fourth modes in an alternative manner;
    in the first mode, the first switch of each phase is ON, and the second, third and fourth switches of each phase are OFF;
    in the second mode, the second switch of each phase is ON, and the first, third, and fourth switches of each phase are OFF;
    in the third mode, the third switch of each phase is ON, and the first, second, and fourth switches of each phase are OFF;
    in the fourth mode, the fourth switch of each phase is ON, and the first, second, and third switches of each phase are OFF; and
    the switch switching circuit switches on/off the switches of each phase at a timing that the voltage instantaneous value of the phase becomes zero to switch the modes.

2. The transforming apparatus according to claim 1, wherein each of the switches includes thyristors connected in parallel in an opposite direction to each other, and the switch switching circuit comprises a voltage detector detecting the gate-to-cathode voltage of each of the thyristors and turns off a thyristor with turning on another thyristor in response to a timing that its gate-to-cathode voltage is detected to have just become zero via the voltage detector of the thyristor to be turned off.

* * * * *